Patented July 2, 1935

2,006,799

UNITED STATES PATENT OFFICE 2,006,799

PROCESS OF PRODUCING DRIED EGG WHITES

Albert K. Epstein, Benjamin R. Harris, Marvin C. Reynolds, and Woldemar M. Sternberg, Chicago, Ill.

No Drawing. Application October 31, 1932, Serial No. 640,528

9 Claims. (Cl. 99—5)

Our invention relates to an improved dried egg albumen, together with a new process of treating egg whites to produce such improved albumen. In commercial practice, dried egg albumen is customarily referred to as dried egg whites and for simplicity this terminology will be employed.

Egg whites are used extensively in many industries and in most cases they are used because of their foaming or beating value. In producing dried egg whites, therefore, it is of prime importance that the maximum beating value be retained so that upon rehydration the dried egg product can be beaten at least as well as the natural fresh product. It is now fairly well established that if the egg whites are allowed to ferment before drying, the final product will have better beating qualities than an egg white which has been dried without previous frementation. Fermentation, however, usually introduces objectionable odors and in the past egg whites having the best beating quality were often objectionable due to their odor. In the prior patents of Epstein and Harris, numbered 1,818,212, 1,818,213 and 1,818,214, a number of processes were disclosed directed to controlling the fermentation so that better beating qualities would be obtained after drying but in which there would be no objectionable odor present. Although the processes there disclosed represent a considerable advance in the art of drying egg whites, they left something to be desired in that the processes had to be controlled accurately and so required a considerable amount of expert skill and careful handling. It is one of the objects of our invention still further to improve dried egg whites and to provide a simple and inexpensive improved process for the production of the improved product.

By means of our invention, we have found that we can improve egg whites when dried according to any of the processes heretofore known, having an effect upon substantially all of the properties of egg whites whereby to enhance their value from substantially every standpoint. More specifically, we have found that after the egg whites have been dehydrated, we can subject them to a relatively high temperature greatly in excess of the normal coagulation temperature and not only improve the beating qualities of the whites by this step alone but also increase the keeping qualities of the product and completely deodorize it as well. We have found in developing our improved process that the egg whites should be either neutral or slightly on the acid side to obtain the best results, particularly to preserve the most desirable color. The hydrogen ion concentration of the liquid eggs, in accordance with our process, may be controlled either by natural or controlled fermentation, or by the addition of organic acids directly to the product without fermentation.

As to the control of the process, we have discovered that if dried egg albumen produced by any process is heated to a substantially higher temperature than the coagulation point after the product has been dried and about 90 to 95% of the water evaporated, and heating continued for a sufficiently long time at the elevated temperature, the product is changed in such a manner that subsequently when it is redispersed in water it will be odorless and will beat up to such an extent that the foam produced will be of a very low specific gravity as it will incorporate a larger amount of air. The stability and volume of the foam are also increased.

We have discovered, for example, that if we take fresh liquid egg whites, dried on trays at ordinary temperatures below the coagulation point, or dried in any other manner, until the product is substantially dry, it will produce a product with a very low forming value and such a dry product, when redissolved in water and whipped with a wire whip in a Hobart machine in the usual manner, will produce a foam of a relatively high specific gravity. If this dried egg albumen produced by this process is then heated substantially above the coagulation point of the egg albumen, namely, at temperatures varying from 80 to 105 degrees C. for several hours, such product when redispersed in water will produce a foam of a much lighter specific gravity. Thus, the foaming value of the product has been improved by the subsequent heating at substantially high temperatures for a sufficient length of time. The product also becomes deodorized.

In the case of dry egg albumen produced by allowing liquid whites to undergo the usual spontaneous fermentation or fermentation with a culture, up to a desired point of acid formation, and moisture evaporated by the usual method below the coagulation point until the product is dry, and then continued to be heated at higher temperatures at 90 to 100 degrees C. for five to six hours, the foaming value of the product will be improved and the albumen will be practically odorless even when soaked in water for a considerable length of time.

Our process is also applicable to a dried egg albumen produced from fermented liquid whites which do not possess good foaming value and the foaming value may be increased by subjecting the dried egg albumen to higher temperatures for a sufficient length of time until the product is so altered that the foaming properties will be increased. If the unfermented dried egg albumen is heated to substantially high temperatures for a considerable length of time, it has a tendency to darken, but nevertheless the foaming properties are increased.

We therefore prefer to acidify the liquid whites with either acetic, lactic acid or similar acids until the product is substantially neutral or even slightly on the acid side, and subject same to drying in the usual process below the temperature of coagulation of the egg albumen by passing a current of air over it, and when the product is substantially dry so that the crystals can be scraped off and the moisture is low, namely, from 5 to 12 per cent., to increase the heating at temperatures above coagulation, namely around 80 degrees C. to 105 degrees C. for several hours, until the foaming value of the resultant product becomes increased to a desirable degree. At very high temperatures, such as 127 degrees, about two hours is sufficient to produce a product which has an excellent foaming value. At 97 degrees a little longer period is required until the product is of the same beating value. At 87 degrees a little longer period is required. We have found that the higher the temperature above 100 degrees, the shorter the time necessary to change the structure of the dried egg albumen to obtain this desired result. If the product is heated at a very high temperature, such as 157 degrees, for a considerable length of time, such as about five hours, it is rendered entirely insoluble. Our invention, therefore, consists in changing the physical chemical structure of the dried egg albumen by heating it at relatively high temperatures above the coagulation point of the egg albumen for a sufficient length of time until the desired result is obtained. Care must be taken not to heat it too high so as to render the product insoluble.

Our invention is applicable to the process of improving the foaming value, and eliminating the odor and improving the keeping qualities of dried egg albumen produced by any of the processes known heretofore. It is also applicable for the process of manufacturing the dried egg albumen by acidifying liquid whites in a suitable acid until the product is substantially neutral, drying same by a current of warm air, keeping the temperature below the temperature of coagulation of the egg albumen. When the product is substantially dry (which when dried on trays takes about forty-eight hours depending upon the humidity), heating the dry crystals at convenient temperatures above the coagulation point for a considerable length of time is continued until the product is deodorized and the foaming value is increased above that present before the dry crystals were subjected to the high temperatures.

The product resulting from our process has greater foaming value than fresh liquid egg whites and also substantially better foaming value than dried egg whites produced by any process heretofore known to us. In other words, by means of the heating step alone, substantially any dried egg white produced by any processes known heretofore can be improved in this respect. The heating step also removes all odors so that the resulting product is substantially free from any objectionable odor. Moreover, the heating step destroys substantially all bacteria, thus producing a product which has a longer life in storage than other products of the same class heretofore made. It is substantially truly sterile insofar as the presence of micro-organisms is concerned.

We are aware that the product of our invention is changed in some respect by the heating step so that after this heating step we no longer have the same product which existed before the heating step. In a strict sense, the product is the same chemically, but we believe that some deep seated change in the colloidal or physical characteristics of the product takes place during the heating. Although we have formulated theories as to the change which takes place in the product, we prefer to define the product by the obvious physical characteristics thereof. Our invention, therefore, concerns both the process and products, independently of how the product itself may be obtained.

When egg whites are dried according to conventional methods, the product usually contains approximately ten or twelve per cent. of moisture. According to our process, the intermediate product which is subjected to the final heating step will contain a proportion of moisture, usually about the same as that specified. The final heating, however, at the elevated temperature, particularly if long continued, will drive off substantially all traces of moisture and the volume of the product will shrink a proportional amount. Roughly, we have found that there is a shrinkage of about one-eighth in volume and weight directly resulting from this heating step.

A thoroughly dehydrated product of this character not only would be sold in competition with a product containing say 12% of moisture on a competitive price basis, but other disadvantages may result in that rehydration may be slowed down to some extent. We have found that we can partially rehydrate the final product to incorporate approximately 12% of moisture therein without sacrificing in any way any of the improved characteristics which have been imparted to the product by the final heating step. When partially rehydrated by the methods which we have employed, the product will retain its improved beating qualities; but will also keep as long as the thoroughly dried product. We believe that the absence of bacteria, therefore, has a very important bearing on the keeping qualities of the dried egg white even though it is substantially partially hydrated. To introduce the moisture, we first cool the dried egg white after the final heating step and then pass steam over it while supporting it in shallow pans or maintain it for a somewhat longer period of time in a warm humid atmosphere. In either case, it is exposed in a relatively finely divided state presenting a large surface to an atmosphere containing a controlled amount of moisture. By properly adjusting the conditions of time, temperature, and humidity, a continuous process can be utilized in which the thoroughly dried product is delivered to the humidifier and a properly and partially hydrated product delivered from the humidifier. In this case, the humidifier can have substantially the same mechanical construction as an ordinary continuous drying oven.

We have described our invention in detail in order that those skilled in the art may practice the same, but we do not restrict ourselves to the specific details disclosed, the invention being limited only by the scope of the appended claims.

What we claim as new and desire to protect by Letters Patent of the United States is:

1. The process of producing dried egg white having improved foaming qualities which comprises heating liquid egg whites at a temperature below the coagulation temperature until the major portion of the moisture has been driven therefrom, and then subjecting the resulting dried product to a temperature above the coagulation point for a sufficient length of time to improve the foaming qualities.

2. The process of producing dried egg white having improved foaming qualities which comprises drying liquid egg whites at a temperature below coagulation temperature of egg albumen and then subjecting the resulting dried product to a temperature above 80° C. until the foaming characteristics have been increased.

3. The method of producing dried egg white having improved foaming characteristics which comprises treating liquid egg whites to increase the hydrogen ion concentration therein to a point of slight acidity or neutrality, drying the egg whites at a temperature below the coagulation temperature of egg albumen, and then subjecting the resulting dried product to a temperature above the coagulation temperature.

4. The method of producing dried egg whites having improved foaming characteristics which includes the step of subjecting dried egg whites to a temperature above 80° C. over a considerable length of time sufficient to improve the beating characteristics thereof but not for a sufficient length of time to render the product insoluble.

5. The method of producing dried egg whites which comprises fermenting liquid egg whites, drying the fermented liquid egg whites at a temperature below the coagulation temperature of egg albumen and then heating the resulting dried product at a temperature above the coagulation temperature.

6. The method of producing dried egg whites which comprises adding an organic acid to liquid egg whites to increase the hydrogen ion concentration therein to a point of slight acidity or neutrality, drying the liquid egg whites at a temperature below the coagulation temperature of egg albumen, and then heating the resulting dried product at a temperature above the coagulation temperature.

7. The method of producing dried egg whites which includes the step of subjecting normally dried egg whites to a temperature above 80° C. until a substantially thoroughly dehydrated product is formed, and then partially rehydrating the final dried product.

8. The method of producing dried egg white having improved foaming characteristics which comprises drying liquid egg whites at a temperature below the coagulation temperature thereof until the major portion of moisture has been evaporated therefrom, subjecting the partially dried egg whites to a temperature above the coagulation temperature until substantially all of the moisture has been driven therefrom, and then partially rehydrating the resulting product to approximately 12% moisture.

9. The method of producing dried egg white having improved foaming characteristics which comprises drying liquid egg whites at a temperature below the coagulation temperature thereof until the major portion of moisture has been evaporated therefrom, subjecting the partially dried egg whites to a temperature above the coagulation temperature until substantially all of the moisture has been driven therefrom, and then subjecting the dried product to a humid atmosphere to partially rehydrate the same.

ALBERT K. EPSTEIN.
BENJAMIN R. HARRIS.
MARVIN C. REYNOLDS.
WOLDEMAR M. STERNBERG.